Patented Sept. 11, 1923.

1,467,516

UNITED STATES PATENT OFFICE.

URLYN C. TAINTON, OF KELLOGG, IDAHO.

PROCESS FOR THE TREATMENT AND LEACHING OF COMPLEX ORES.

No Drawing.
Application filed October 13, 1919, Serial No. 330,383. Renewed November 14, 1923. Serial No. 600,988.

*To all whom it may concern:*

Be it known that I, URLYN C. TAINTON, a subject of the King of England, residing at Kellogg, in the county of Shoshone and State of Idaho, have invented new and useful Improvement in Processes for the Treatment and Leaching of Complex Ores, of which the following is a specification.

This invention relates to a process for the treatment and leaching of complex ores and has for its object to render the process more expeditious and certain and the extraction of metals greater.

When complex ores containing iron, zinc, copper, etc., are roasted as a preliminary step to the leaching out of the values, certain compounds are formed in the furnace which are difficult to dissolve in the solvents ordinarily used. For example, zinc oxide combines with ferric oxide to give zinc ferrate $ZnOFe_2O_3$. This compound is almost insoluble in acid of the strengths ordinarily used and leads to low extractions of the zinc. Copper behaves similarly.

It is found that when a solution containing free sulphuric acid; for instance, 240 grams per litre of solution, is gradually neutralized by successive additions of roasted zinc ore, that part of the ore which is added after the acid strength has fallen below 100 grams per litre of solution, yields a relatively low extraction, inasmuch as the zinc, combined as zinc ferrate, is not soluble in acid below this strength. The same applies to the copper values when these are present.

It is found that these complex ores, after roasting, consist of two parts zinc ferrate, etc., forming one portion, and the oxides and sulphate of zinc, and copper, the other portion, the oxides and sulphates of zinc and copper being easily soluble in a weak acid solution while the zinc ferrates and other complex compounds require a strong acid solution.

I have also discovered that it is possible, by means of magnetic separation, to separate these two portions, one having the greater magnetic permeability and containing the copper and zinc ferrates and other more difficultly soluble compounds and the other containing the oxides and sulphates of zinc and copper which are soluble in a comparatively weak acid solution.

In the practical operation of the process, the roasted ore from the furnace is preferably first screened to remove lumps. The ore is then separated, as stated, by passing it over a magnetic separator of any suitable type. The ore is thus divided into two portions, usually about equal to each other. The magnetic portion or the least soluble ore, is then added to the acid solution containing approximately 240 grams sulphuric acid per litre of solution. The ore and solution is then thoroughly agitated and more ore is added until the acid has fallen to about one-half its original strength. The non-magnetic or easily soluble portion of the ore is then added until the solution is nearly neutral and the iron contained is nearly precipitated. The solution is then ready for filtration and is filtered in any suitable manner, the metals in solution being precipitated after filtration has taken place by an electrolytic process or in any other suitable manner.

From the foregoing it can be seen that the whole of the copper and zinc ferrates and other complex ores are subjected to a leaching action with a strong acid and that the same solution is employed to leach the more easily soluble values when the strong solution has been reduced to approximately half its original strength. This procedure results in a great increase in the extraction of the contained metals, as I have been able to increase the zinc extraction from eighty to ninety-five per cent and the copper extraction from sixty to ninety per cent.

A further advantage is that when the ferrates dissolve in the acid, iron is also dissolved in considerable quantities and when this is later preciptated by the addition of the oxide portion of the ore, any arsenic which, if present in the solution, would be prejudicial to the subsequent electrolysis, is thereby removed. The iron precipitated by the oxide portion forms hydrated ferric oxide which combines with the arsenic to produce an insoluble compound and is thereby removed from the solution.

Having thus described my invention. what I claim and desire to secure by Letters Patent is—

1. A method of treating and leaching complex ores, which consists in separating a roasted ore into two portions, one containing compounds which are difficult to dissolve and the other containing easily soluble compounds, subjecting the difficultly soluble compounds to the leaching action of a strong acid solution and then leaching the easily soluble ore with an acid solution after its strength has been suitably reduced.

2. A method of treating and leaching complex ores containing copper and zinc ferrates and other compounds difficult to dissolve, together with oxides and sulphates of zinc and copper which are easily soluble, which consists in separating the ore into two portions, one containing the difficultly soluble compounds and the other the easily soluble ore, subjecting the difficultly soluble compounds to the leaching action of a strong acid solution and then leaching the easily soluble ore with the same acid solution after its strength has been reduced.

3. A method of treating and leaching complex ores containing copper and zinc ferrates and other difficultly soluble compounds, together with oxides and sulphates of zinc and copper which are easily soluble, which consists in magnetically separating the ore into two portions, one containing the difficultly soluble portion and the other the easily soluble portion, subjecting the difficultly soluble portion to the leaching action of a strong acid solution and then leaching the easily soluble portion with the same acid solution after its strength has been reduced to a point where the difficultly soluble portion will not readily dissolve.

4. A method of treating and leaching complex ores containing copper and zinc ferrates and other difficultly soluble compounds, together with oxides and sulphates of zinc and copper which are comparatively easily soluble, which consists in magnetically separating the ore into two portions, one containing compounds difficult to dissolve and the other containing compounds easily soluble, subjecting the difficultly soluble compounds to the leaching action of a sulphuric acid solution containing approximately 240 grams of acid per litre of solution and then leaching the easily soluble compounds with the same acid solution after its strength has been reduced.

In testimony whereof I have hereunto set my hand in the presence of two subscribing witnesses.

URLYN C. TAINTON.

Witnesses:
PAUL W. CLARK,
LEWIS T. LEYSON.